United States Patent
Bletzer et al.

(10) Patent No.: US 9,858,817 B1
(45) Date of Patent: Jan. 2, 2018

(54) METHOD AND SYSTEM TO ALLOW DRIVERS OR DRIVERLESS VEHICLES TO SEE WHAT IS ON THE OTHER SIDE OF AN OBSTRUCTION THAT THEY ARE DRIVING NEAR, USING DIRECT VEHICLE-TO-VEHICLE SHARING OF ENVIRONMENT DATA

(71) Applicant: International Business Machines Corporation, Armonk, NY (US)

(72) Inventors: Nicholas J. Bletzer, Eton Wick (GB); Christopher G. Floyd, Eastleigh (GB); Malcolm M. Warwick, Dorking (GB)

(73) Assignee: International Busines Machines Corporation, Armonk, NY (US)

( * ) Notice: Subject to any disclaimer, the term of this patent is extended or adjusted under 35 U.S.C. 154(b) by 0 days.

(21) Appl. No.: 15/285,198

(22) Filed: Oct. 4, 2016

(51) Int. Cl.
| | |
|---|---|
| H04N 7/00 | (2011.01) |
| G08G 1/16 | (2006.01) |
| G08G 1/04 | (2006.01) |
| G08G 1/0967 | (2006.01) |
| B60R 1/00 | (2006.01) |
| H04N 5/232 | (2006.01) |
| G06K 9/00 | (2006.01) |

(52) U.S. Cl.
CPC ............ G08G 1/161 (2013.01); B60R 1/00 (2013.01); G06K 9/00791 (2013.01); G08G 1/04 (2013.01); G08G 1/0967 (2013.01); H04N 5/23238 (2013.01); B60R 2300/102 (2013.01); B60R 2300/202 (2013.01); B60R 2300/301 (2013.01)

(58) Field of Classification Search
CPC ............ H04N 5/23238; H04N 5/2628; H04N 5/2259; G06T 3/4038; G02B 13/06
USPC .......................................................... 348/36
See application file for complete search history.

(56) References Cited

U.S. PATENT DOCUMENTS

| | | | |
|---|---|---|---|
| 8,884,782 B2 | 11/2014 | Rubin et al. | |
| 9,216,737 B1* | 12/2015 | Zhu | G05D 1/02 |
| 2002/0198632 A1* | 12/2002 | Breed | B60N 2/2863 |
| | | | 701/1 |

(Continued)

OTHER PUBLICATIONS

Bajpayee et al, A Comparative study about Autonomous Vehicle, 2105.*

(Continued)

Primary Examiner — Shan Elahi
(74) Attorney, Agent, or Firm — Scully, Scott, Murphy & Presser, PC; David Zwick, Esq.

(57) ABSTRACT

In a vehicle communication system of vehicles, vehicles share environment data such as their location data and 360 degree view of the world with other vehicles using direct vehicle-to-vehicle (V2V) real-time data streams. A displayable map of potentially dangerous obstructions on the surrounding roadway is formed using in vehicle environment sensors allowing a driver or the controls of a driverless vehicle to be warned of the danger. A map of blind spots is built up to speed up the processing of incoming data in order to create a more complete picture of surrounding vehicles. Shared data is used to position each vehicle relative to the target vehicle. By sharing obstruction maps between vehicles, a more complete picture of the roadway can be displayed—and one vehicle can in effect "see" through another vehicle or an obstruction.

23 Claims, 17 Drawing Sheets

Composite 360 view from Vehicles A, B and C

(56) References Cited

U.S. PATENT DOCUMENTS

| | | | |
|---|---|---|---|
| 2007/0182528 A1* | 8/2007 | Breed | B60Q 9/008 340/435 |
| 2008/0046150 A1* | 2/2008 | Breed | B60R 21/0134 701/45 |
| 2010/0191446 A1* | 7/2010 | Mc Donald | F02N 11/0837 701/113 |
| 2010/0198513 A1 | 8/2010 | Zeng et al. | |
| 2012/0218412 A1* | 8/2012 | Dellantoni | G01C 21/3602 348/148 |
| 2013/0027195 A1* | 1/2013 | Van Wiemeersch | B60W 30/12 340/431 |
| 2013/0278769 A1 | 10/2013 | Nix et al. | |
| 2014/0063255 A1* | 3/2014 | Breed | B60R 21/0134 348/148 |
| 2014/0136414 A1* | 5/2014 | Abhyanker | G06Q 50/28 705/44 |
| 2014/0176716 A1* | 6/2014 | Wallat | B62D 15/025 348/148 |
| 2014/0341434 A1 | 11/2014 | Lin et al. | |
| 2015/0077270 A1 | 3/2015 | Rubin et al. | |
| 2015/0266421 A1 | 9/2015 | Brubaker | |
| 2016/0231747 A1* | 8/2016 | Neff | G05D 1/0231 |

OTHER PUBLICATIONS

Abbas et al, Self-orgnizing Control Framework for Driverless Vehicles, 2013.*
Godoy et al, An Approach to Driverless Vehicles in Highways, 2011.*
Caup et al, Video-based Trailer Detection and Articulation Estimation, Jun. 23-26, 2013.*
Milanes et al, An Approache to Driverless Vehicles in Highways, Oct. 5-7, 2011.*
CBS News—Technology & Science, Samsung's See-Through Trucks aim to reduce risk of passing on highway, http://www.cbc.ca/news/technology/samsung-s-see-through-trucks-aim-to-reduce-risk-of-passing-on-highway-1.3124315, Jun. 23, 2015, pp. 1-2.
Coxworth, Ben, "See-Through System turns view-blocking vehicles transparent", http://newatlas.com/see-through-system/29446/, Oct. 17, 2013, pp. 1-5.

\* cited by examiner

METHOD AND SYSTEM TO ALLOW DRIVERS OR DRIVERLESS VEHICLES TO SEE WHAT IS ON THE OTHER SIDE OF AN OBSTRUCTION THAT THEY ARE DRIVING NEAR, USING DIRECT VEHICLE-TO-VEHICLE SHARING OF ENVIRONMENT DATA

BACKGROUND

Aspects of the present invention generally relate to a method in a vehicle communication system of vehicles sharing their location data and 360 degree view of the world with other vehicles using direct vehicle-to-vehicle (V2V) real-time data stream.

Other vehicles will then utilize this data to build up a 360 degree view of the world from an aggregation of the data. This composite view would in turn be shared directly with other vehicles, filling in any gaps in their 360 degree view to enable the vehicles to see beyond obstructions/vehicles given that another vehicle that is sharing this data has a view behind the obstruction. The view of the world aggregated by the receiving vehicle will be adjusted based on a number of factors, such as speed and direction of the vehicle and/or stopping distance.

SUMMARY

An aspect of the invention is a method to build up a displayable map of potentially dangerous obstructions on the surrounding roadway using in vehicle environment sensors allowing a driver or the controls of a driverless vehicle to be warned of the danger. A blind spot is a gap or gaps of a vehicle 360 degree view of the world map indicating the presence of an obstruction or hidden object.

Further, by sharing obstruction maps between vehicles, a more complete picture of the roadway can be displayed—and one vehicle can in effect "see" through another vehicle or an obstruction.

A map of blind spots is built up to speed up the processing of incoming data in order to create a more complete picture of surrounding vehicles. Shared data is used to position each vehicle relative to the target vehicle. Sharing of composite vehicle data between vehicles enable the target vehicle to "see" around obstructions.

A vehicle-to-vehicle (V2V) system relates to co-operative communications for a vehicle based on two-way communications for interacting in real time. These systems are preferably directed at traffic management, collision warning, and collision avoidance. Such systems can extend a host vehicle's range of awareness of surrounding environmental conditions by providing relevant information regarding the status of traffic in addition to any safety related events occurring in proximity to those neighboring vehicles of the host vehicle.

An exemplary method, of enabling a target vehicle in a vehicle communication system of vehicles sharing environment data such as their location data and 360 degree view of the world with other vehicles using direct vehicle-to-vehicle (V2V) real-time data streams to locate a hidden vehicle in a blind spot on a roadway comprises forming by a target vehicle a direct 360 degree view of the target vehicle surroundings containing blind spots; forming by a sending vehicle a direct 360 degree view of the sending vehicle surroundings and sending the direct view to the target vehicle via vehicle-to-vehicle real-time data stream; receiving at the sending vehicle, not in a blind spot of the target vehicle, via vehicle-to-vehicle real-time data stream a direct 360 degree view from the hidden vehicle; forming at the sending vehicle a composite data stream by combining the 360 degree direct image formed by the sending vehicle surroundings with the direct 360 degree view from the hidden vehicle and sending the composite data stream via vehicle-to-vehicle real-time data stream to the target vehicle, and combining a the target vehicle the composite data stream with the target vehicle direct view to fill in blind spots thereby enabling the target vehicle to locate the hidden vehicle.

An exemplary vehicle communication system of vehicles sharing environment data such as the vehicle location data and 360 degree view of the world with other vehicles using direct vehicle-to-vehicle (V2V) real-time data streams comprises: a target vehicle including a sensor and a processor building a 360 degree direct view of its surroundings containing blind spots; the target vehicle sensor determining the position of the target vehicle relative to a sending vehicle and identifying blind spots in the target vehicle surroundings; a hidden vehicle including a sensor sending V2V data streams of its direct view of its surroundings to the sending vehicle; the sending vehicle including a sensor building a direct view data stream of its surroundings and combining its direct view of its surroundings with the data streams from the hidden vehicle for forming a composite data stream and sending the direct view data stream and the composite data stream to the target vehicle, and the target vehicle using received direct view data stream and the composite data stream from the sending vehicle to fill in blind spots in the target vehicle 360 degree direct view thereby enabling the target vehicle to locate the hidden vehicle.

DETAILED DESCRIPTION OF PREFERRED EMBODIMENTS

Driving accidents often occur because drivers are not aware of potential dangers on the road.

One of these dangers is obstructions on the road that the driver may collide with. These obstructions could be debris, unseen stationary vehicles or other vehicles in motion.

For example, when a vehicle is passing another vehicle on the roadway, it is not possible to directly see what is on the other side of another vehicle obstructing the view. When driving on a multi-lane road and passing a truck, the driver often cannot see what is on the other side of the truck. This creates a dangerous situation if there is an unseen vehicle on the other side of the truck that the driver or driverless vehicle cannot see.

Figure 1:
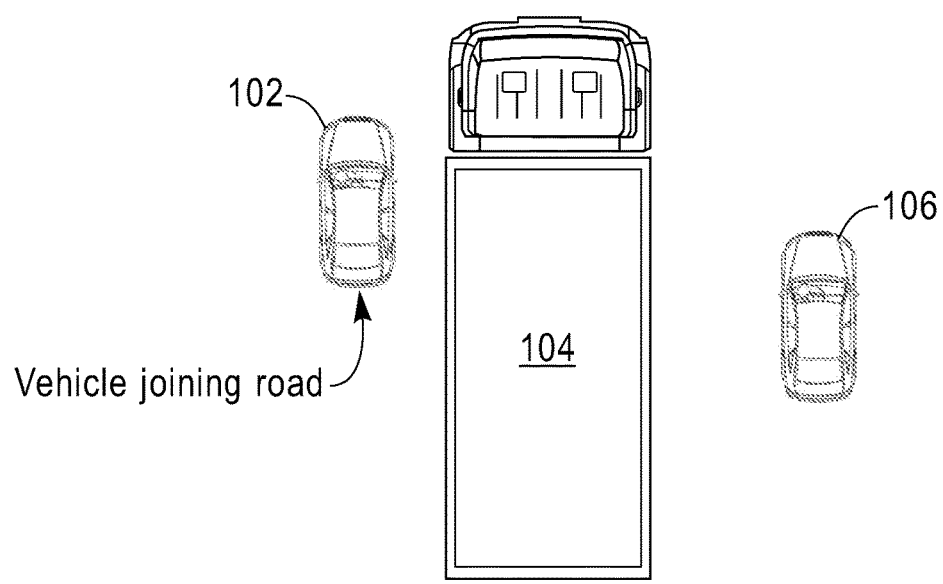
FIG. 1 shows a vehicle entering a roadway next to a truck while there is a vehicle on the other side of the truck which is not seen by vehicle entering the roadway.
Figure 2:
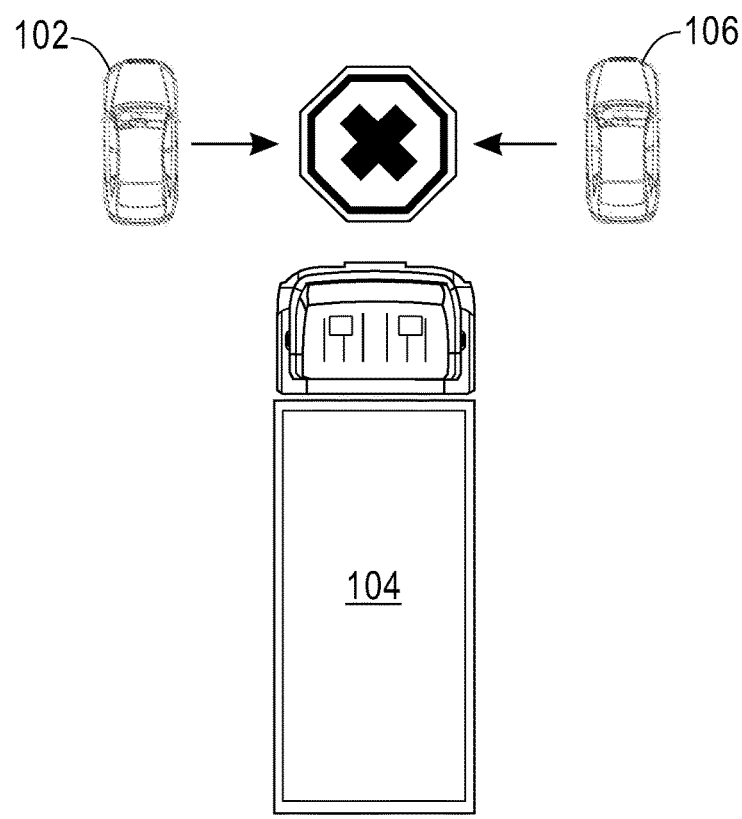
FIG. 2 illustrates a situation where two vehicles try to move into the same lane used by the truck thereby creating a danger of a collision.

An example of this is where a vehicle is entering a roadway next to a truck, while another vehicle is passing the truck on the other side of the truck. In FIG. 1 vehicle 102 is entering the roadway next to truck 104 while there is a vehicle 106 on the other side of truck 104 which is not seen by vehicle 102. If both vehicles try to move into the lane used by the truck, there is a danger of a collision as shown in FIG. 2.

This danger is also present with driverless vehicles. While the reaction time of a driverless vehicle may be faster than a vehicle with a human driver, the driverless vehicle would have to take unexpected avoidance actions to prevent colliding with the vehicle it did not see. This, in turn, could cause other surrounding vehicles to swerve to avoid the vehicle taking avoidance actions, causing a chain reaction collision effect.

Modern vehicles collect environment data about the surrounding area on a roadway in a number of different ways, such as, video cameras, radar, ultrasound, etc. This information from sensors allows a suitably equipped vehicle to build up a 360 degree view of what is directly visible to the vehicle. A process for building up a 360 degree view is described below.

The first step in this method is for a vehicle to build its own 360 degree view of the environment, and use that view to identify any obstructions that may be other vehicles.

An obstruction here is defined as any part of the 360 degree view from a vehicle where there is less than a calculated safe distance visible. Calculating this safe distance is described below.

These obstructions can be displayed to the driver of the vehicle to highlight any potential danger areas. A simple calculation over time can be used to identify any obstructions which are moving towards the vehicle, and these can be highlighted in the display to the driver. A warning signal can be used to alert the driver if any obstruction is judged to be moving dangerously fast towards the vehicle.

But more advantageously in this case, by building up the map of obstructions it is possible to identify blind spots behind which other potential dangers can be hiding.

And by identifying only these blind spots, the processing power on the vehicle can be focused on filling in the gaps in what it can see with information that will be supplied by other vehicles as described below.

Figure 3:
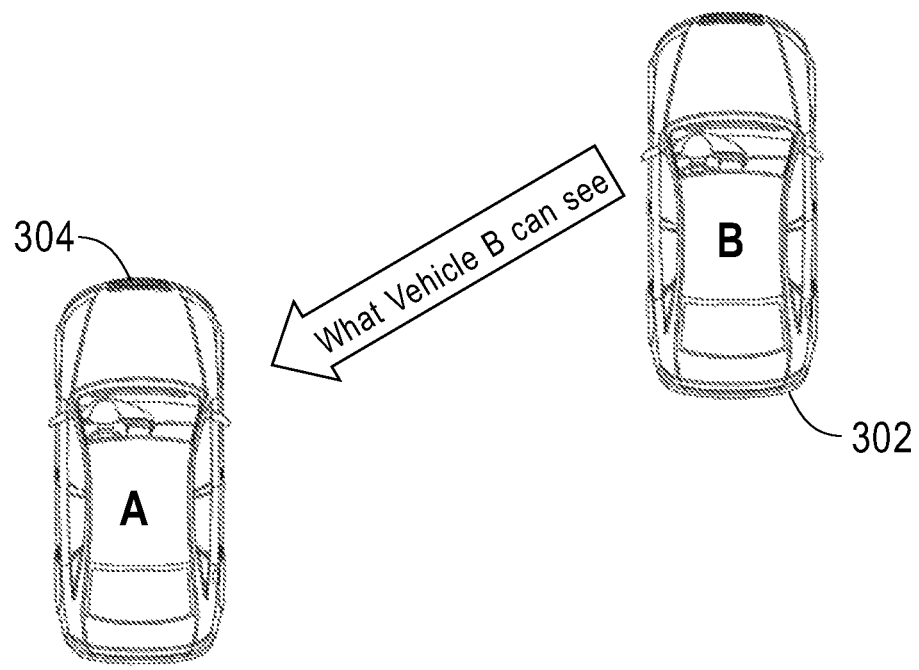
FIG. 3 shows a sending vehicle transferring data of what the sending vehicle detects to a target vehicle.

This 360 degree view of what a vehicle can (and cannot) see will then be shared with any surrounding vehicles using a direct vehicle-to-vehicle real-time data stream. Data transfer methods are known in the art and may include existing Bluetooth or NFC technologies, or others that may be developed. In FIG. 3 sending vehicle B 302 is transferring data of what vehicle B detects to target vehicle A 304. The data transfer does not have to be long range as it is direct from vehicle-to-vehicle. The data transfer does not pass through a remote location.

The target vehicle (Vehicle A in the figures) then uses the information sent from another, sending vehicle (for example, Vehicle B in the figures) to firstly work out the relative positions of the two vehicles.

The target vehicle has already identified any obstructions in its view—the sending vehicle may be only one of these obstructions.

Figure 4:
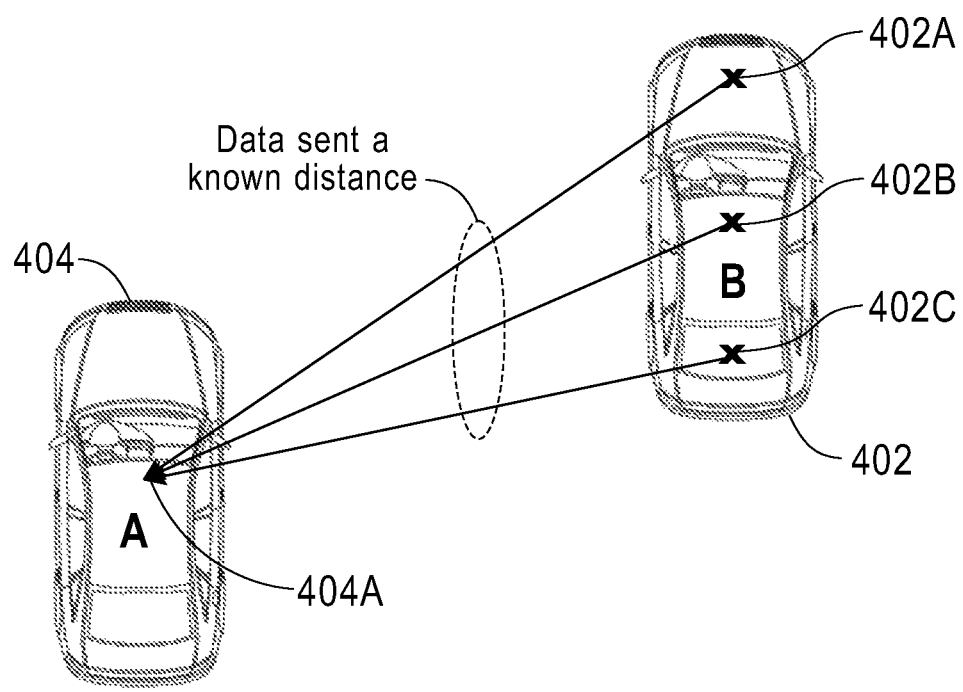
FIG. 4 shows a sending vehicle broadcasting its information from three physically separate broadcast points, a distance apart in the vehicle, one point directly in front of the other.

The sending vehicle will broadcast its information from three physically separate points a distance apart in the vehicle, one directly in front of the other. In FIG. 4, the broadcast (or transmission) points 402A, 402B, and 402C are shown. The data stream from each transmission point is received by the target vehicle at location 404A of the target vehicle. For reasons explained below, two streams of data are already required for the complete method.

The third stream broadcasts information to locate the vehicle: the distance between the broadcast points (which may differ from vehicle to vehicle), an atomically correct timestamp, the length of the vehicle and any other data that the vehicle can share to indicate the direction of travel of the vehicle.

All three streams would broadcast a shared unique ID used to match the data streams.

Using simple trigonometry, this would allow the target vehicle to calculate a set of potential locations for the sending vehicle 402 in FIG. 4.

If there are a number of possible 'candidate' obstructions that the target vehicle is able to see, the information can be combined using a simple pattern matching algorithm to determine which of the visible obstructions is the sending vehicle.

Once the target vehicle knows the location of the sending vehicle, the target vehicle overlays the information sent from the sending vehicle onto its own 360 degree view, filling in any blind spots.

Figure 5:
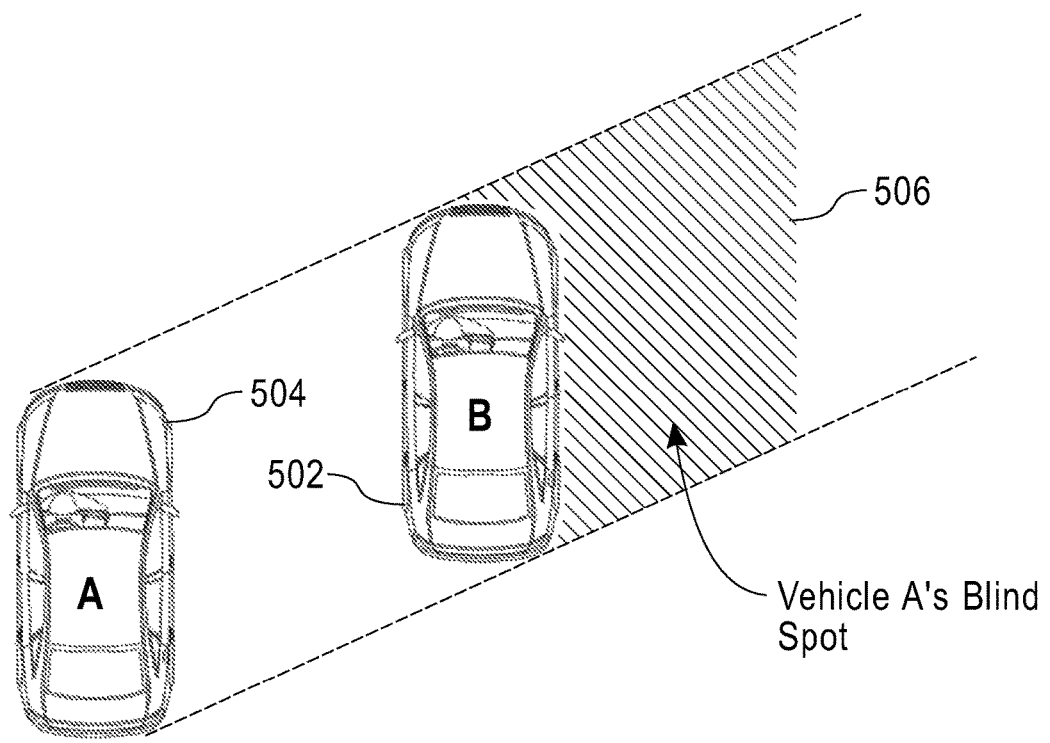
FIG. 5 shows a blind spot of target vehicle (Vehicle A) caused by the obstruction of a blocking vehicle (Vehicle B).

FIG. 5 shows the blind spot 506 of Vehicle A 504 caused by the obstruction of Vehicle B 502.

Figure 6:
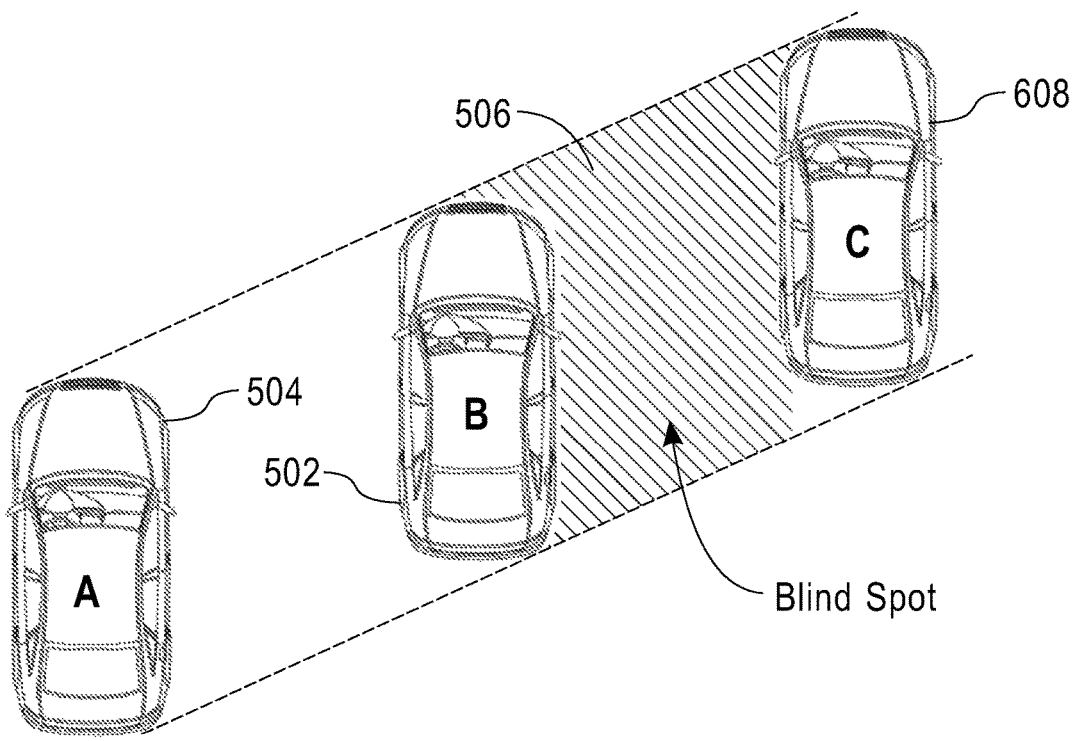
FIG. 6 shows a third vehicle (Vehicle C) which could be hiding in the blind spot making the third vehicle unseen by the target vehicle.

FIG. 6 shows that a third vehicle (Vehicle C 608) which could be hiding in the blind spot 506 making the third vehicle unseen by Vehicle A.

Figure 7:
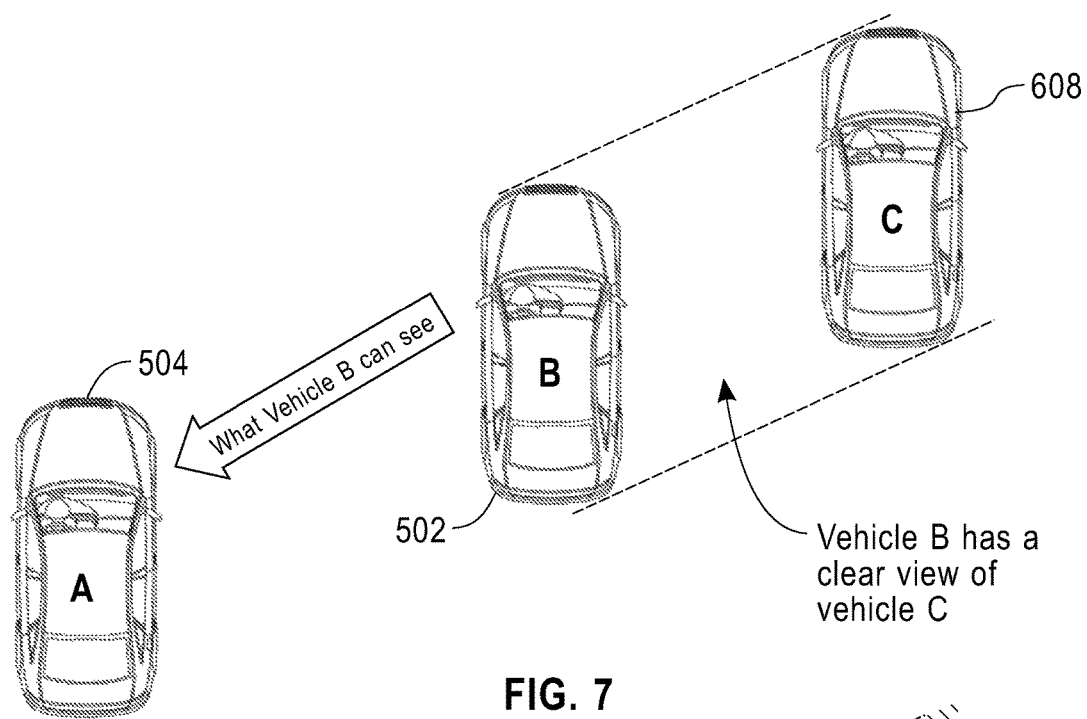
FIG. 7 shows combining what target vehicle (Vehicle A) can directly see with the information which sending vehicle (Vehicle B) is providing by transferring data from the sending vehicle to the target vehicle.

FIG. 7 shows that by combining what Vehicle A can directly see with the information Vehicle B is providing by transferring data from sending Vehicle B to target Vehicle A, Vehicle A can effectively "see through" Vehicle B to add the obstruction (Vehicle C) seen by Vehicle B to Vehicle A's view. The ability to "see through" a sending vehicle by virtue of the data transferred from the sending vehicle to the target vehicle is an advantageous aspect of the invention.

Figure 8:
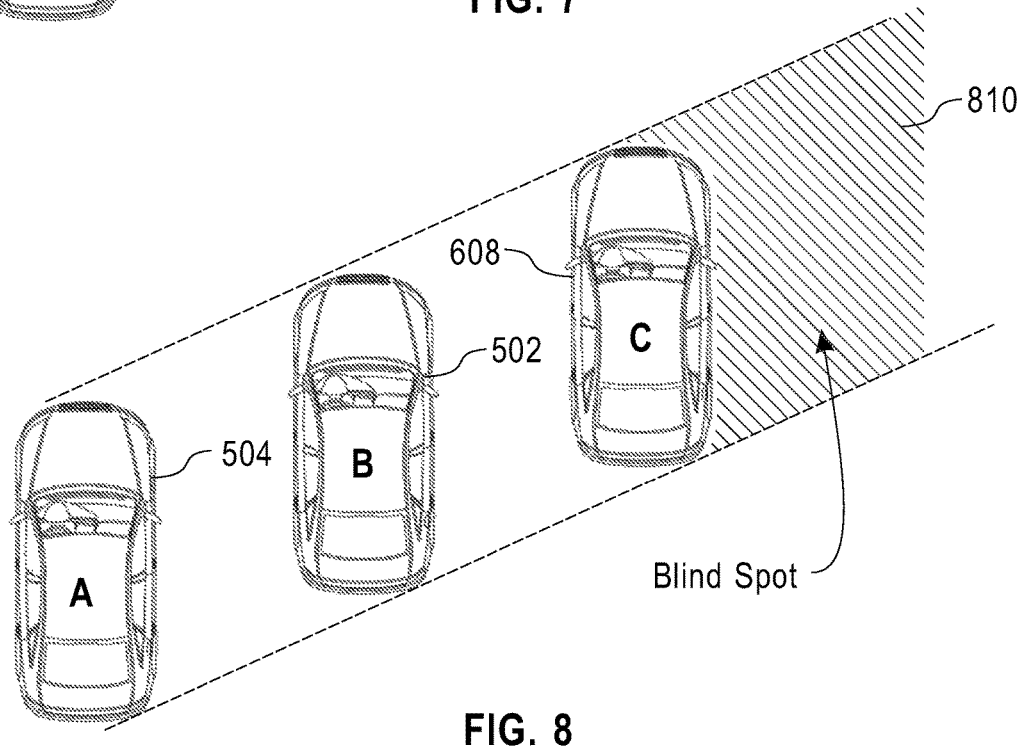
FIG. 8 shows another blind spot hiding behind a vehicle.

FIG. 8 shows that there is still another blind spot 810, hiding behind (from Vehicle A 504's perspective) the Vehicle C 608.

However, Vehicle B has already built up what will be referred to as its Composite view—a combination of what Vehicle B can directly sense and information from surrounding vehicles used to fill in its blind spots.

Figure 9:
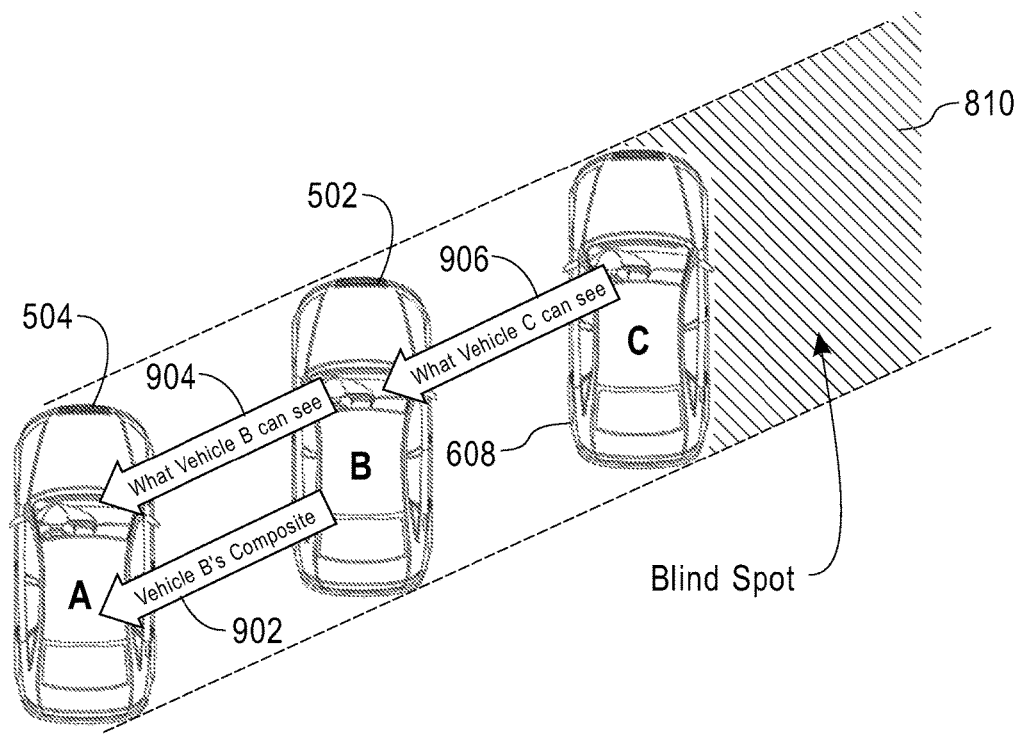
FIG. 9 shows sending vehicle sharing its Composite view with other vehicles, along with the sending vehicle's Direct view.

The additional step is for Vehicle B to share its Composite view 902 with other vehicles, along with vehicle B's Direct view 904 as shown in FIG. 9. Composite view 902 is formed by combining Vehicle B's Direct view 904 with the transferred data from Vehicle 608 of what it sees.

Figure 14:
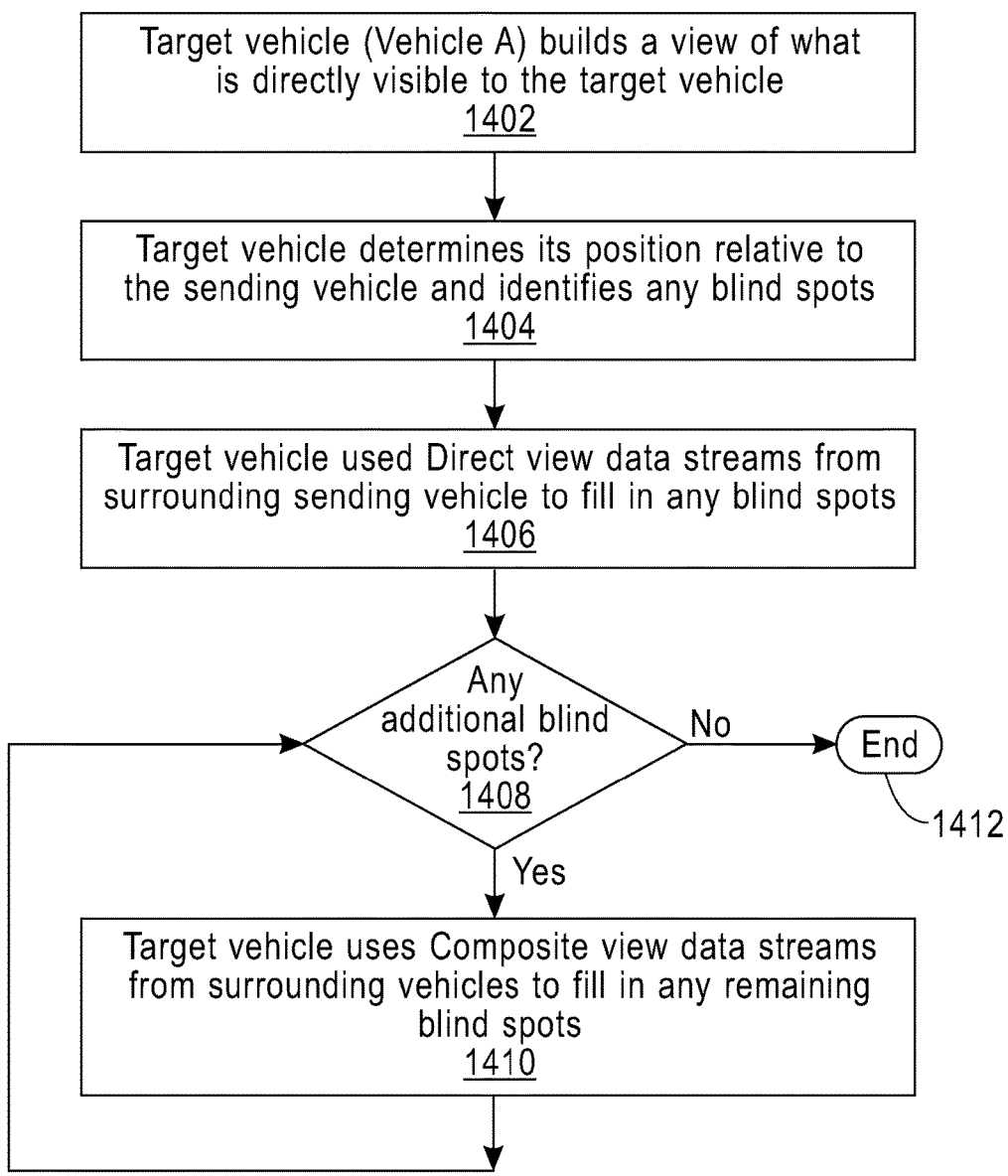
FIG. 14 is a flow chart of an aspect of a method for practicing the invention.

The process described above 1400 is shown in the flow chart in FIG. 14.

In step 1402, the target vehicle, Vehicle A, builds up a view of what is directly visible to the target vehicle.

In step 1404, the target vehicle determines its position relative to a sending vehicle and identifies any blind spots.

In step 1406, the target vehicle uses the Direct view streams from surrounding vehicles to fill in any blind spots.

In step 1408, a determination is made whether there are any additional blind spots. If there are no remaining blind spots, the process ends 1412.

In step 1410, if it is determined that there are additional blind spots, target vehicle (Vehicle A) uses composite view data streams from surrounding sending vehicles to fill in any additional blind spots. Further determination is made whether there are any additional blind spots and the process continues until a determination is made that there are not any additional blind spots and the process ends 1412.

In step 1412, if there are no additional blind spots the process ends.

In performing the method, target vehicle, Vehicle A, is only filling in the blind spots, which reduces the processing effort required by target vehicle.

The method can be extended for sharing of more data streams, thereby increasing the number of obstructions that can be "seen through".

It is expected that sharing only the direct and composite streams from each vehicle will be sufficient to fill in most blind spots, as will be shown below. As described above, any obstructions that cannot be "seen through" cause the remaining blind spots to be highlighted as potentially dangerous areas.

Figure 10:
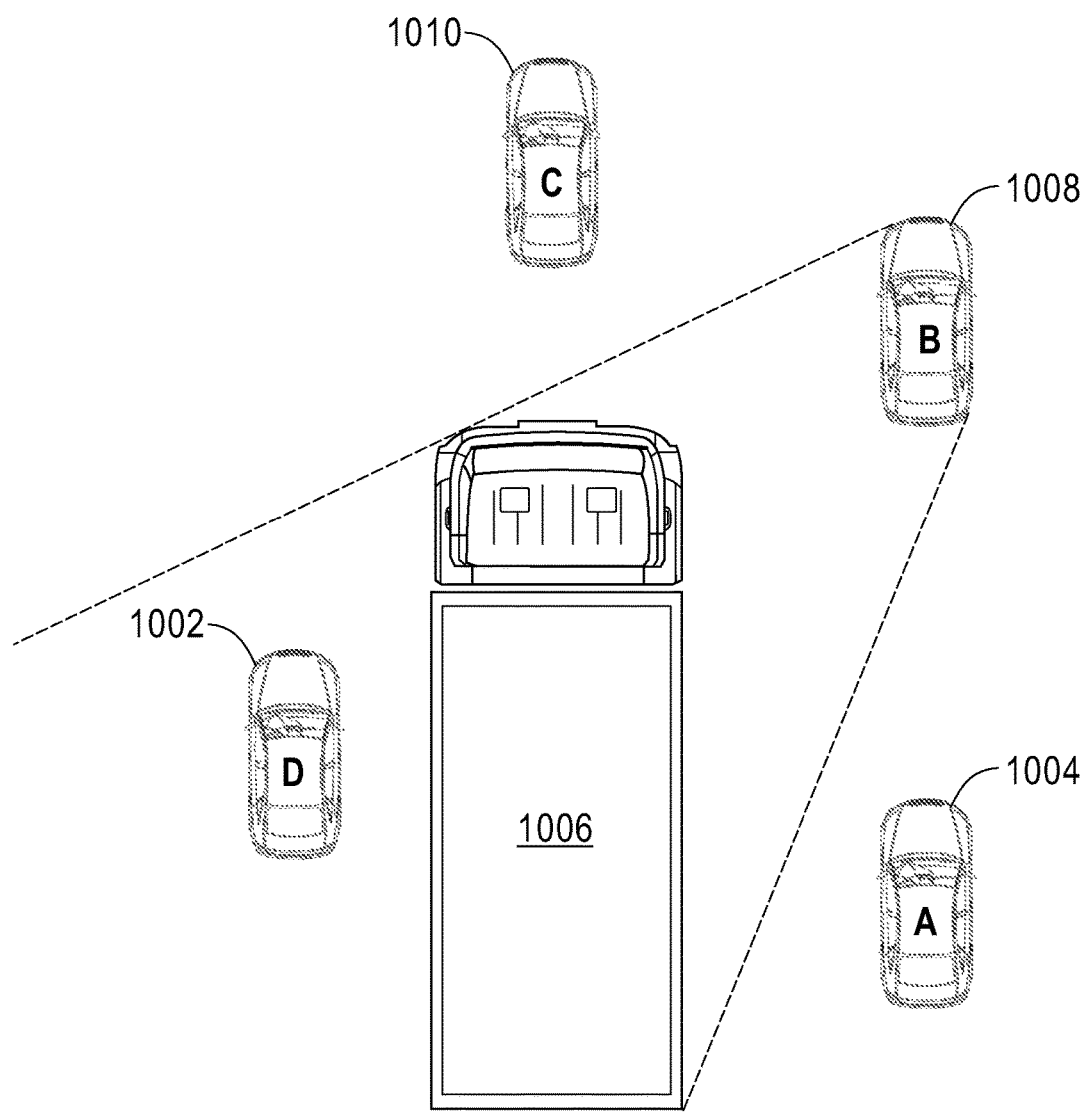
FIG. 10 shows the situation, where another vehicle is joining the roadway and the target vehicle cannot see it.

Returning to the original dangerous situation—a vehicle entering a roadway is hidden behind a truck 1006. FIG. 10 shows this situation, where Vehicle D 1002 is joining the roadway and Vehicle A 1004 cannot see Vehicle D.

If the truck 1006 is equipped with V2V technology to implement an embodiment of the described method, then Vehicle A 1004 will be able to "see through" the truck and the driver of Vehicle A will be made aware of the danger.

However, if the truck is not equipped with the V2V technology, the above described method will allow Vehicle A 1004 to see Vehicle D 1002 as described below.

In FIG. 10, Vehicle B 1008 has been drawn at a location where it is visible to Vehicle A 1004 but cannot directly see Vehicle D 1002 hidden by the truck.

Figure 11:
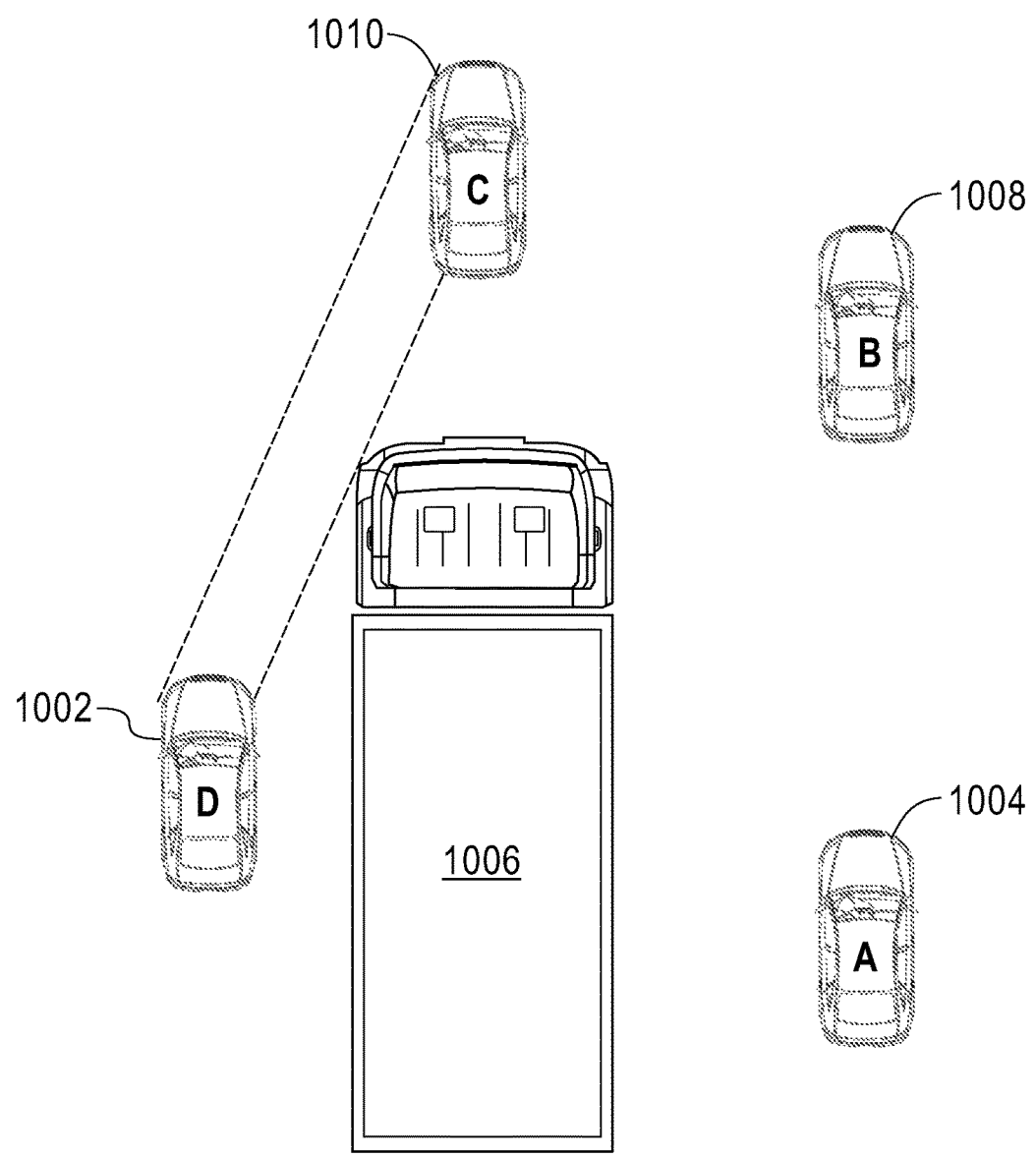
FIG. 11 shows another vehicle directly visible to the sending vehicle.

In FIG. 11 Vehicle D 1002 is directly visible by Vehicle C 1010.

Figure 12:
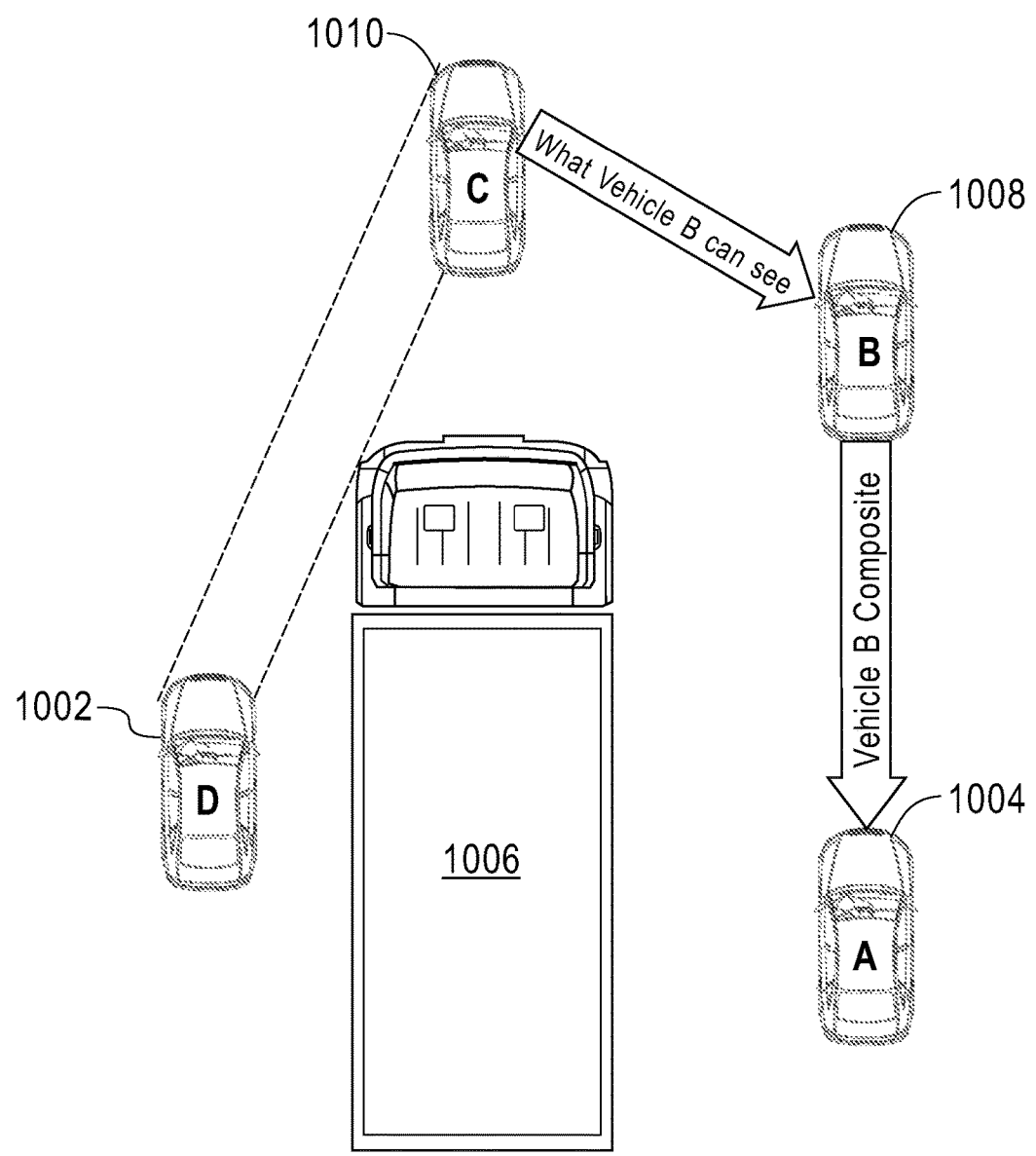
FIG. 12 shows that a Composite view built up by the sending vehicle includes data from another vehicle which is shared with the target vehicle so the another vehicle is no longer hidden from the target vehicle.

In FIG. 12 the Composite view built up by Vehicle B 1008 will include Vehicle D 1002 by virtue of data received from Vehicle C and this data is shared with Vehicle A—so Vehicle D 1002 is no longer hidden from Vehicle A 1004.

A method for calculating the required visible distance in any direction is now described. A minimum visible distance is required at all times—for example, 10 meters.

Figure 13:
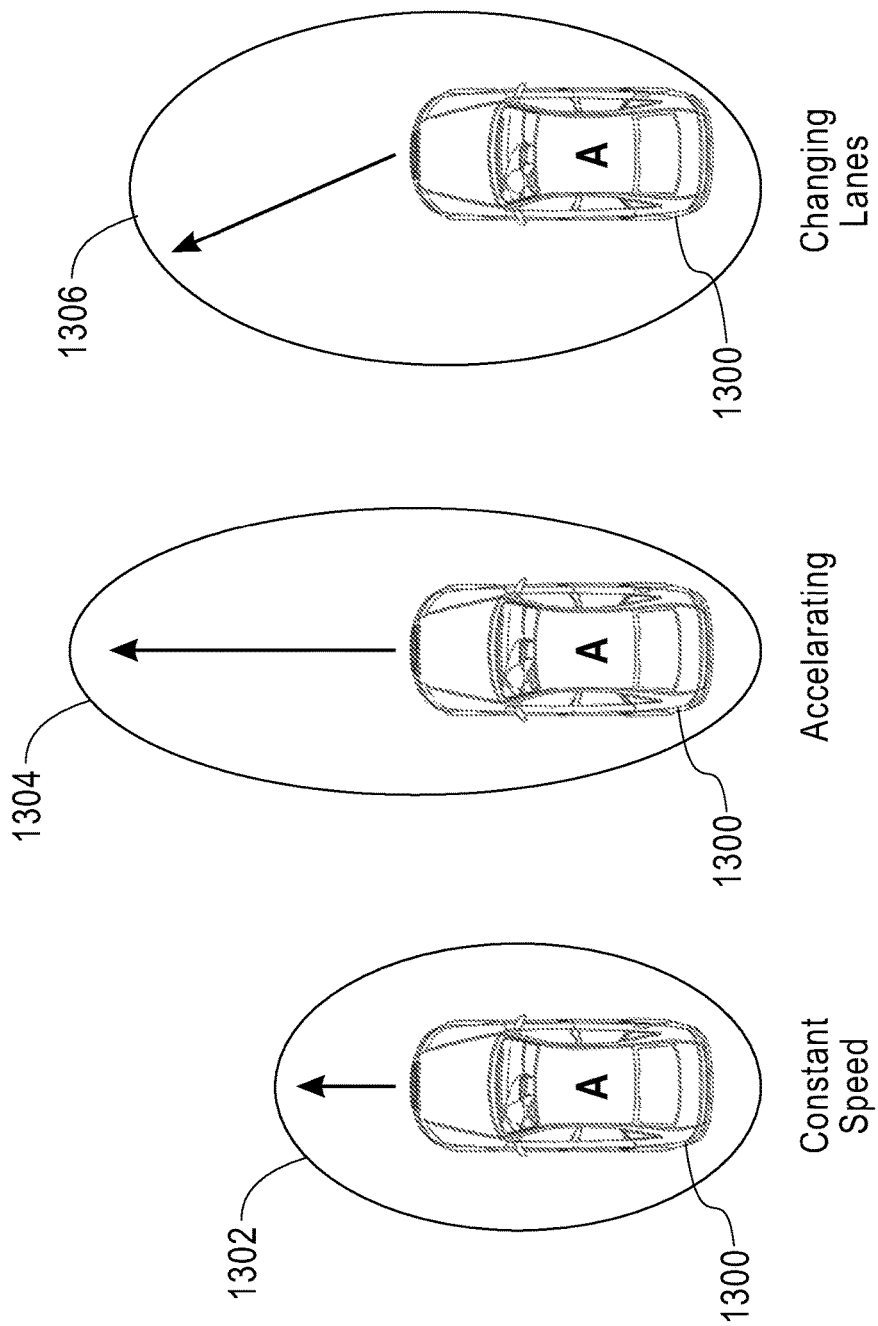
FIG. 13 shows examples of how a minimum safe distance bubble expands when speeds change or lanes are changed.

The minimum visible distance will be increased based on the speed the vehicle is traveling in the direction in question. The calculation could use the Typical Stopping Distance as recommended by local road authorities, where it is more than the minimum stated above. This creates a bubble of safe visible distance 1302 around the vehicle 1300 traveling at constant speed, relative to its speed. FIG. 13 shows examples of how this bubble expands when speeds change 1304 or lanes are changed 1306.

Figure 15:
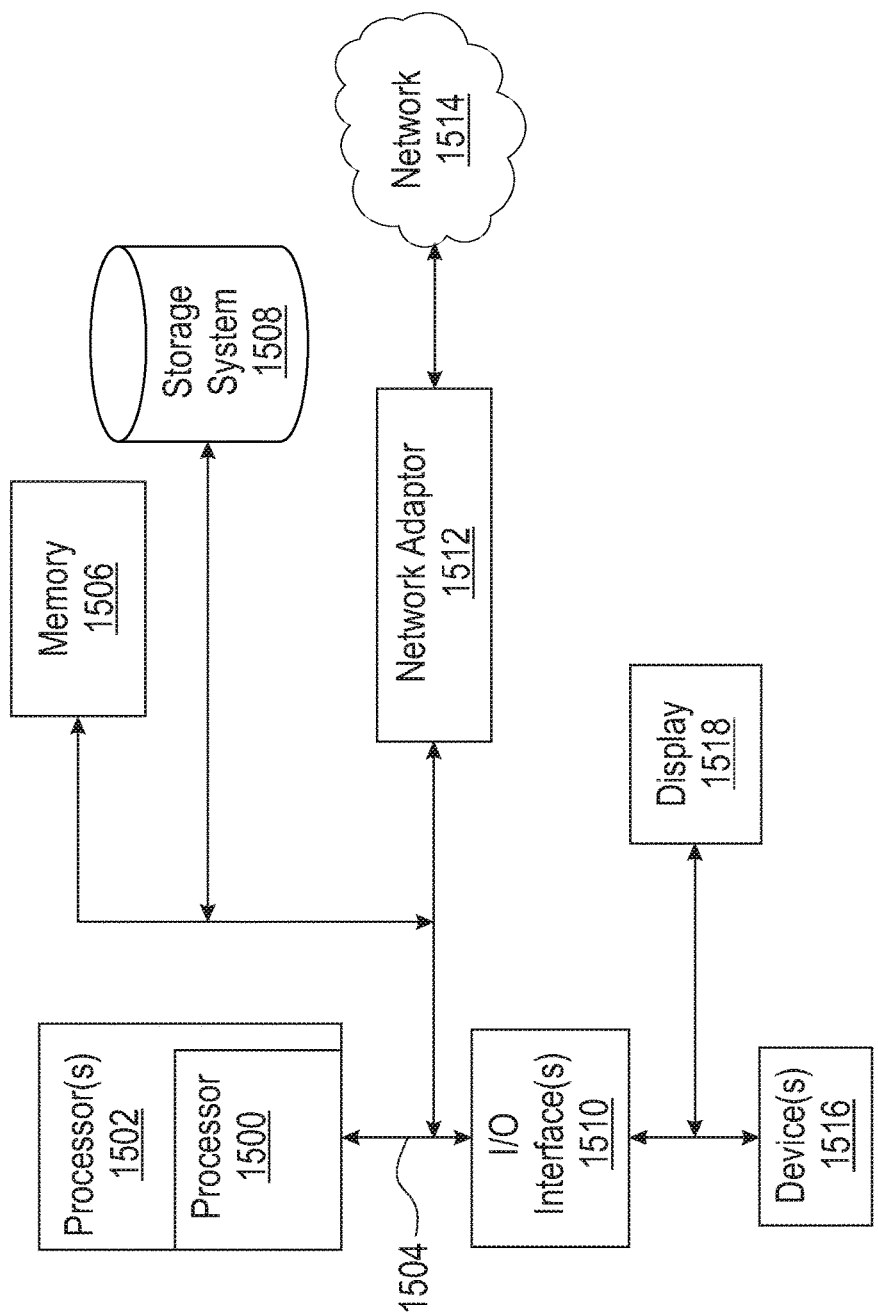
FIG. 15 is a schematic block diagram of a computer system for practicing various embodiments of the invention.

FIG. 15 illustrates a schematic diagram of an example computer or processing system that may implement in a vehicle communication system of vehicles sharing their location data and 360 degree view of the world with other vehicles using direct vehicle-to-vehicle (V2V) real-time data stream in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 15 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 1502, a system memory 1506, and a bus 1504 that couples various system components including system memory 1506 to processor 1502. The processor 1502 may include a module 1500 that performs the methods described herein. The module 1500 may be programmed into the integrated circuits of the processor 1502, or loaded from memory 1506, storage device 1508, or network 1514 or combinations thereof.

Bus 1504 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 1506 can include computer system readable media in the form of volatile memory, such as random access memory (RAM) and/or cache memory or others. Computer system may further include other removable/non-removable, volatile/non-volatile computer system storage media. By way of example only, storage system 1508 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1504 by one or more data media interfaces.

Computer system may also communicate with one or more external devices 1516 such as a keyboard, a pointing device, a display 1518, etc.; one or more devices that enable a user to interact with computer system; and/or any devices (e.g., network card, modem, etc.) that enable computer system to communicate with one or more other computing devices. Such communication can occur via Input/Output (I/O) interfaces 1510.

Still yet, computer system can communicate with one or more networks 1514 such as a local area network (LAN), a general wide area network (WAN), and/or a public network (e.g., the Internet) via network adapter 1512. As depicted, network adapter 1512 communicates with the other components of computer system via bus 1504. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 16:
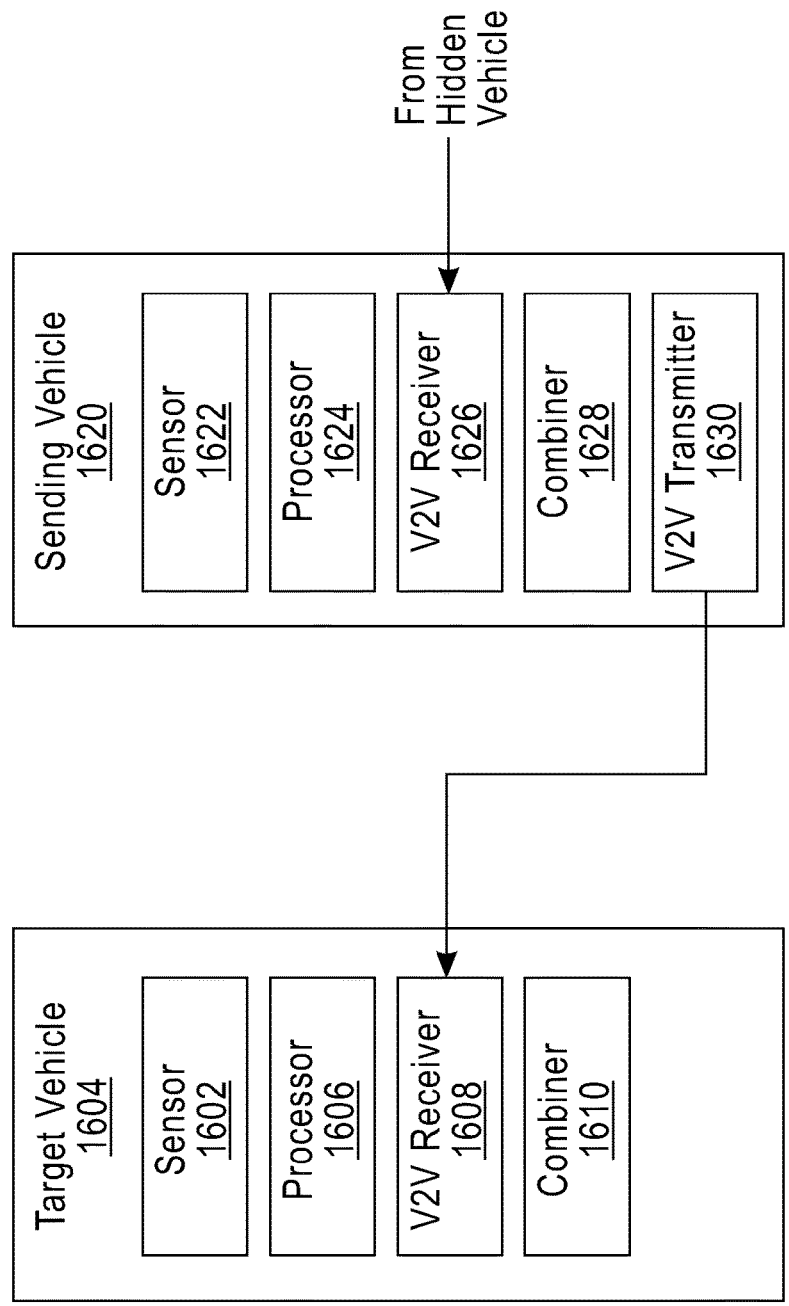
FIG. 16 is a schematic block diagram of a system incorporating an aspect of the invention.

FIG. 16 is a schematic block of a system incorporating an aspect of the invention. A sensor 1602, such as video cameras, radar sensor, ultrasound sensor, and the like, incorporated in a target vehicle 1604 senses objects in proximity to target vehicle 1604. Processor 1606 creates a 360 degree view map of the surroundings around target vehicle 1604 using the signals received by the sensor. In the course of creating the map, the processor 1606 determines the position of the target vehicle relative to the position of a sending vehicle 1620. The processor also determines if there are any blind spots and their location(s). A blind spot is a gap in the 360 degree view map.

Sending vehicle 1620 includes a sensor 1622, such as video cameras, radar sensor, ultrasound sensor and the like, for sensing objects, such as another vehicle, in proximity to the sending vehicle 1620. A processor 1624 creates a 360 degree view map of the surroundings around the sending vehicle. The sending vehicle further includes a V2V receiver 1626 and a combiner 1628. The V2V receiver receives data streams from surrounding (hidden) vehicles to fill in any blind spots around the target vehicle. The combiner 1628 combines the map of what the sending vehicle senses and the data stream from the surrounding vehicle.

The composite view data stream and the direct view data stream from the sending vehicle are transmitted by V2V transmitter 1630 in the sending vehicle to the V2V receiver 1608 in the target vehicle. The sending vehicle transmits the data stream from three physically separated points, one directly in front of the other. Two of the transmission points transmit the direct view data stream and the composite view data stream, respectively. The third transmission point transmit information to locate the vehicle: the distance between the broadcast points (which may differ from vehicle to vehicle), an atomically correct timestamp, the length of the vehicle and any other data that the vehicle can share to indicate the direction of travel of the vehicle. All three streams broadcast a shared unique ID used to match the data streams.

A combiner 1610 in the target vehicle combines the map prepared by the processor 1606 with the received direct view data stream and composite data streams from the sending vehicle in order to fill in the blind spots in the 360 degree view map of the target vehicle.

The process continues where the target vehicle uses composite view data streams from surrounding vehicles until any remaining blind spot is filled.

It will be understood by those skilled in the art that while the combiner is shown as a separate element, it can be incorporated into the processor.

A process of creating a 360 degree view from sensor data will now be described in conjunction with FIGS. 17-22.

Figure 17:
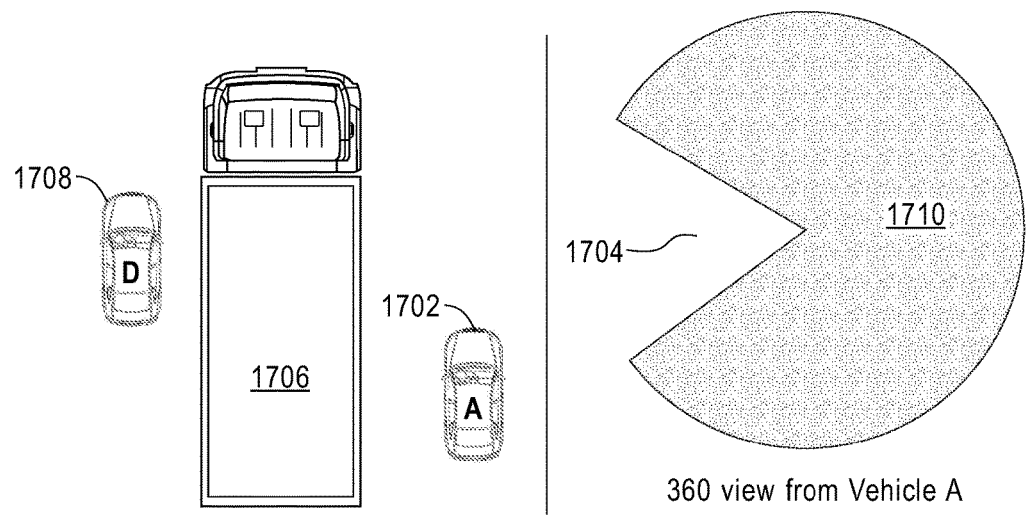
FIG. 17 shows an arrangement of vehicles and a 360 degree view from a target vehicle with blind spots.

In FIG. 17, target vehicle A has a 360 degree view as shown by the circle 1710 with a blind spot 1704 caused by the truck 1706 blocking the vehicle D 1708 from vehicle A's view. The solid portion of the circle 1710 is the 360 degree view from vehicle 1702

Figure 18:
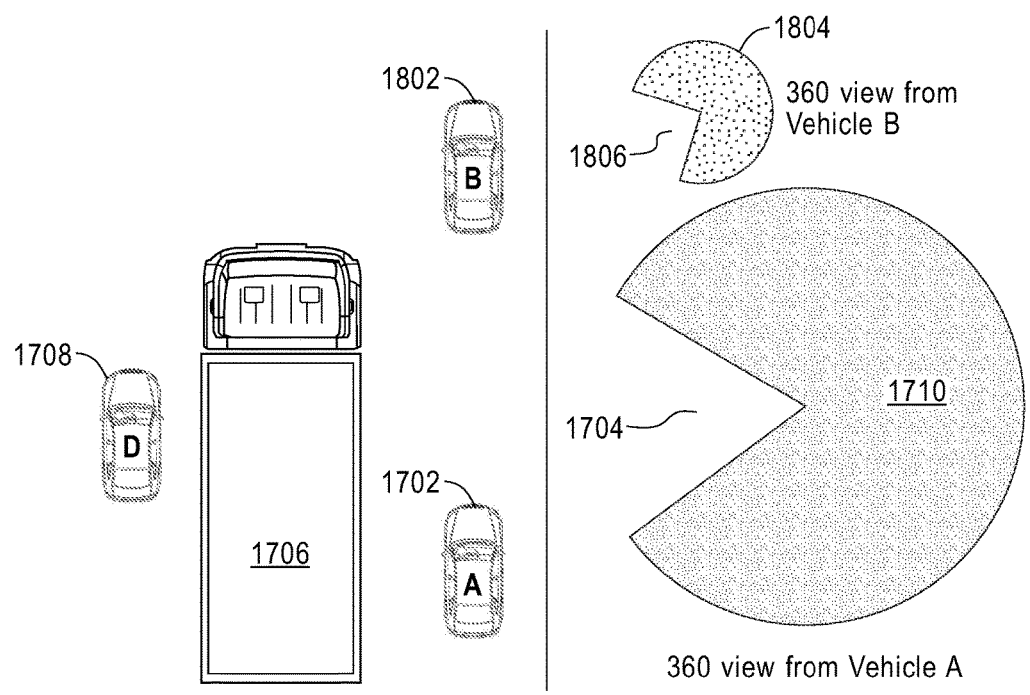
FIG. 18 shows an arrangement of vehicles and 360 degree views from a sending vehicle and a target vehicle.
Figure 19:
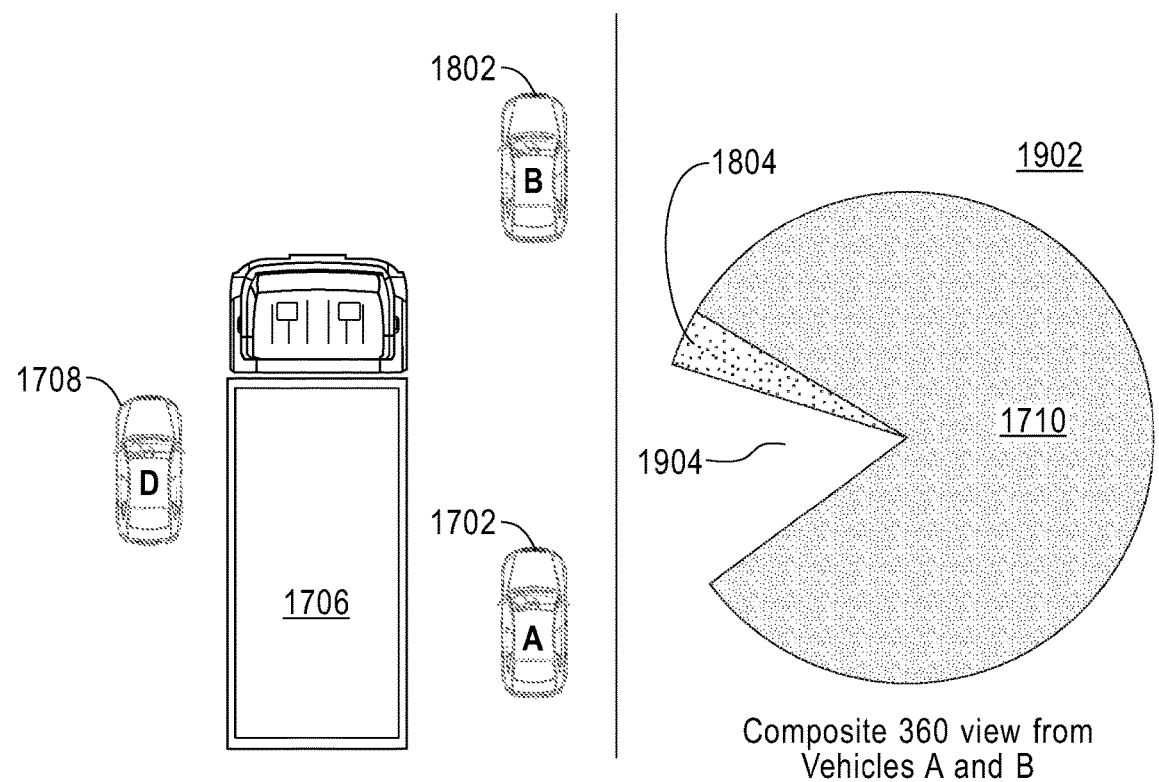
FIG. 19 shows an arrangement of vehicles and a composite 360 degree view of a sending vehicle and a target vehicle.

In FIG. 18, a vehicle B 1802 builds up its individual view shown in the partial circle 1804. The blind spot 1806 in vehicle B's view is caused by the truck 1706 at a different angle relative to vehicle B than the angle of the truck relative to vehicle A 1702.

As described above, the multiple points of broadcast associated with each vehicle, the receiving vehicle establishes the relative position and orientation of each car sending its data. To the receiving vehicle In FIG. 19, vehicle B sends data to the target vehicle A enabling the view from vehicle A and vehicle B to be combined (overlaid) to form a composite view 1902. There is still a blind spot 1904 limiting vehicle A's ability to locate vehicle D.

Figure 20:
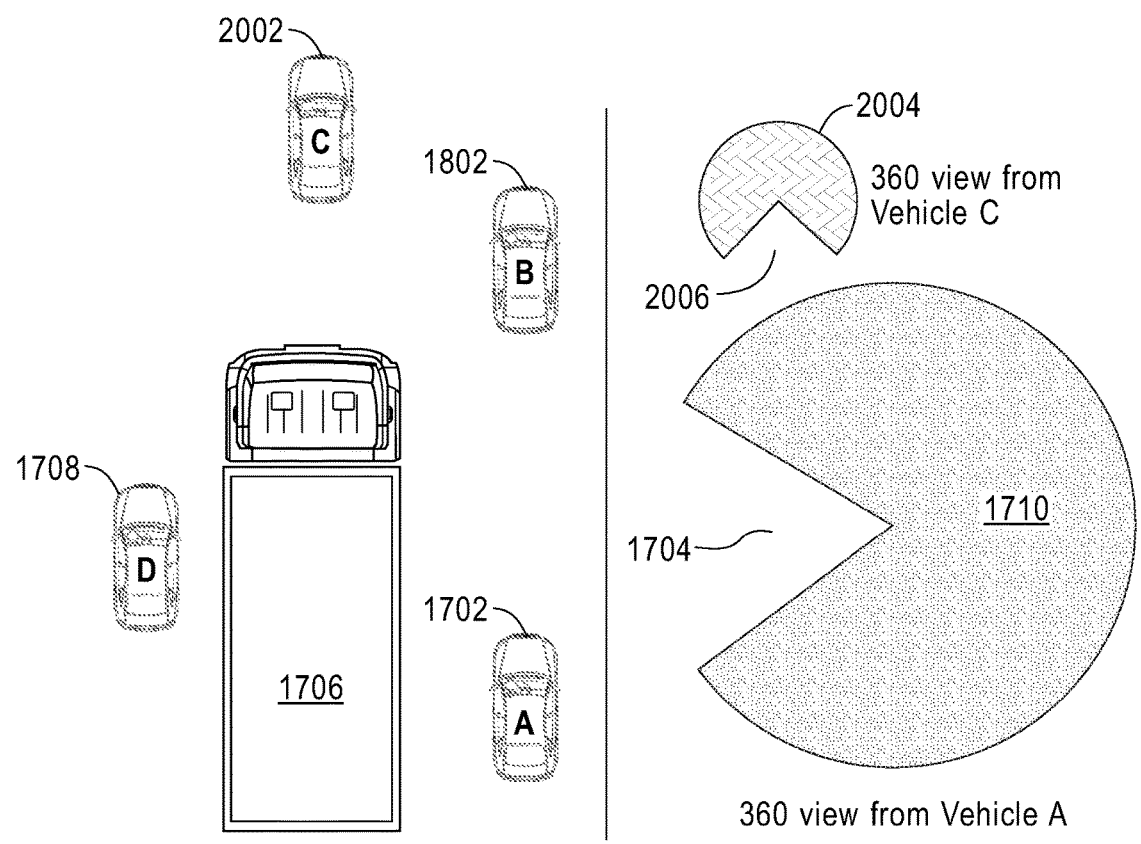
FIG. 20 shows an arrangement of vehicles and 360 views from a sending vehicle and a target vehicle.

In FIG. 20, vehicle C 2002 builds an individual view shown in the partial circle 2004 showing a blind spot 2006.

Figure 21:
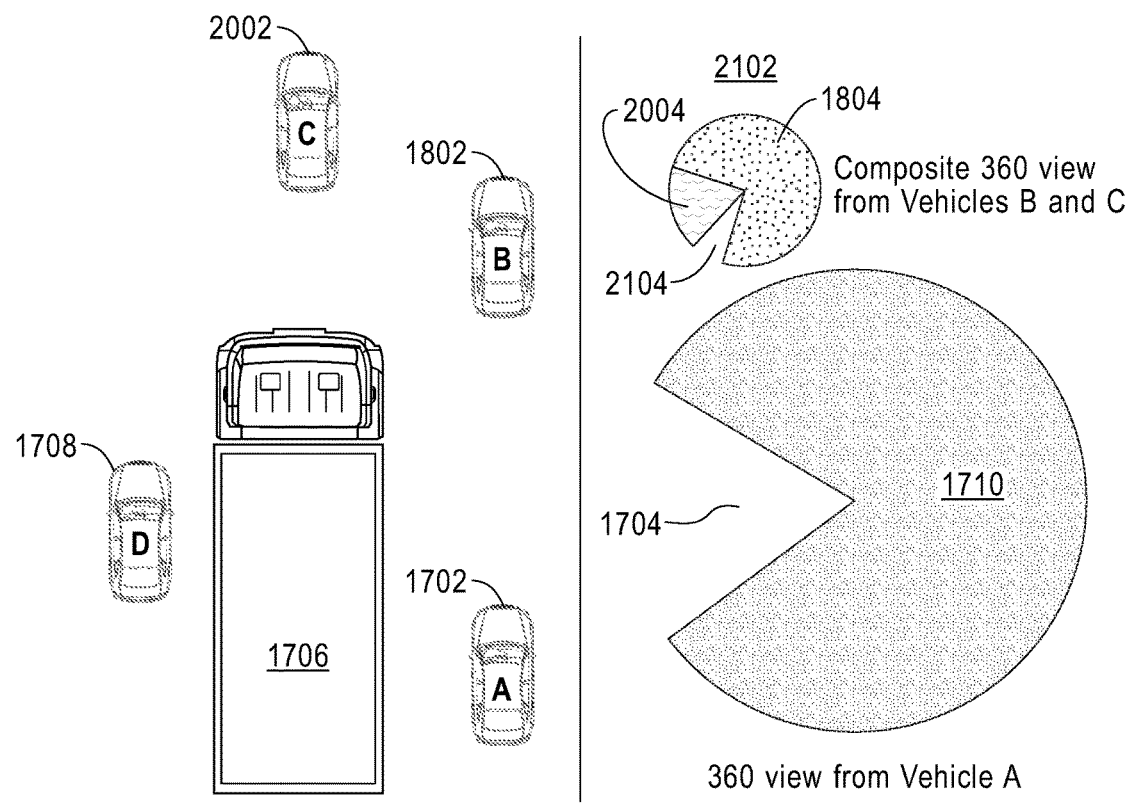
FIG. 21 shows an arrangement of vehicles with a composite 360 degree view from multiple sending vehicles and the target vehicle.

In FIG. 21, vehicle C sends data to vehicle B enabling the individual views of vehicle B 1802 and vehicle C 2002 to be combined to form a composite 360 degree view 2102 with a blind spot 2104.

Figure 22:
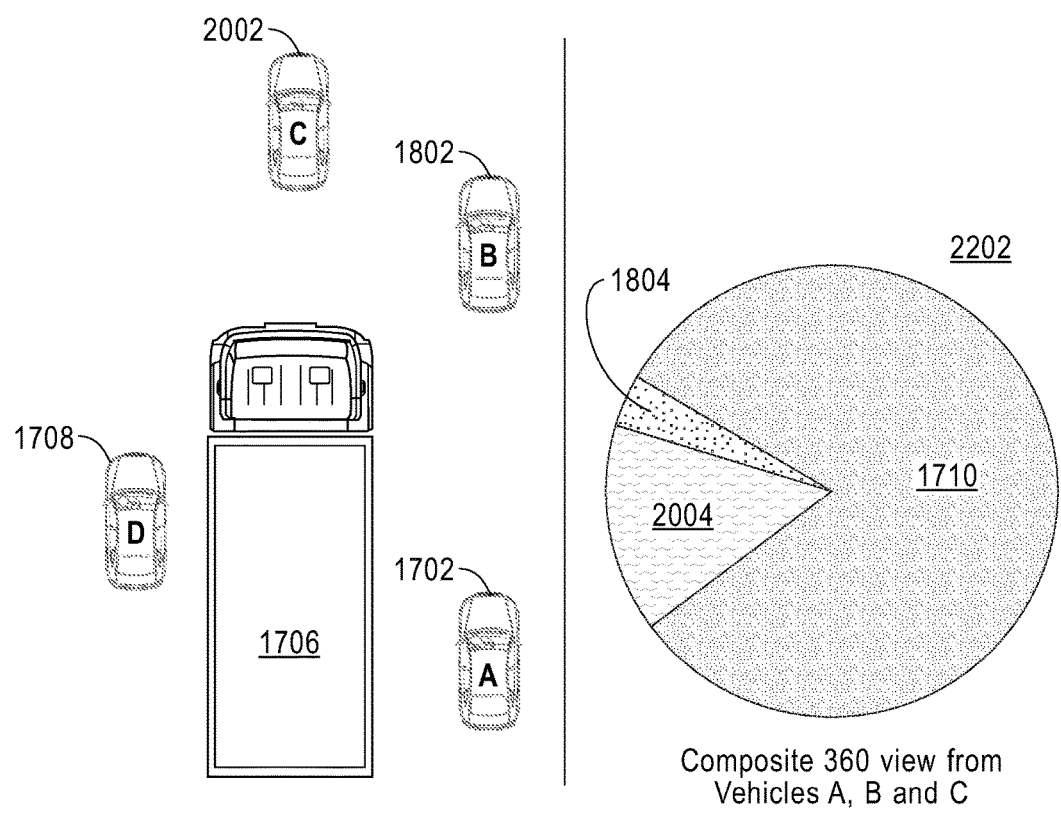
FIG. 22 shows an arrangement of vehicles with a composite 360 degree view of each sending vehicle and the target vehicle without a blind spot.

In FIG. 22, vehicle B sends the composite data representing the combined views of vehicle B and C to target vehicle A which, in turn, combines the received composite data with vehicle A's view to form a 360 degree view 2202 without any blind spots. Vehicle A is then able to locate vehicle D which was hidden from vehicle A's view by the truck 1706.

The process of creating a 360 degree view is performed by overlaying the sending vehicle's data on top of the existing blind spots in the receiving vehicle's data.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of building a 360 degree direct view surrounding a target vehicle using direct vehicle-to-vehicle (V2V) real-time data streams comprising:
   receiving, by a hardware processor associated with a target vehicle, from one or more sensors attached to the target vehicle, a sensor real-time data stream;
   building, at the hardware processor, a 360 degree direct view around the target vehicle based on the received sensor real-time data stream, wherein the 360 degree direct view includes a blind spot, defined by a visual obstruction beyond which another vehicle may be located;
   receiving, by the hardware processor from a second vehicle, a first V2V real-time data stream that includes data representing a 360 degree direct view around the second vehicle, and a position of origin of the second vehicle relative to the target vehicle, wherein the target vehicle and the another vehicle in the blind spot are within the 360 degree direct view around the second vehicle;
   receiving, by the hardware processor from the second vehicle, a second V2V real-time data stream that includes a composite data stream representing the first V2V real-time data stream and a 360 degree direct view around the another vehicle, and
   forming, by the hardware processor, based on the received first and the received second V2V real-time data streams and the position of origin of the second vehicle relative to the target vehicle, a composite 360 degree direct view around the target vehicle in which information representing the blind spot is replaced with a representation of a 360 degree direct view around the target vehicle without the obstruction and the location where the another vehicle is located enabling the target vehicle to see beyond the blind spot.

2. The method of claim 1, wherein the target vehicle is a driverless vehicle.

3. The method of claim 1, wherein the position of origin of the second vehicle relative to the target vehicle, the first V2V real-time data stream, and the second V2V real-time data stream are transmitted from respective locations at the second vehicle.

4. The method of claim 1, further comprising the hardware processor displaying the 360 degree view around the target vehicle.

5. The method of claim 1, wherein additional positions of origin are second vehicles, additional first V2V real-time data streams, and additional second V2V real-time data streams from additional second vehicle are received until any remaining blind spots are replaced.

6. A vehicle communication system of vehicles sharing environment data such as the vehicle location data and 360 degree view of the world with other vehicles using direct vehicle-to-vehicle (V2V) real-time data streams comprising:
   a target vehicle including a sensor and a processor building a 360 degree direct view of the target vehicle surroundings containing a blind spot;
   the target vehicle sensor determining the position of the target vehicle relative to a sending vehicle and identifying the blind spot in the target vehicle surroundings;
   a receiver at the sending vehicle receiving V2V real-time data streams from a hidden vehicle, said V2V data from the hidden vehicle representing a direct view of the hidden vehicle surroundings;
   the sending vehicle including a sensor building a V2V real-time direct view data stream of the sending vehicle surroundings and combining the sending vehicle direct view of the sending vehicle surroundings with the V2V real-time data streams from the hidden vehicle for forming a composite V2V real-time data stream and sending the V2V real-time direct view data stream and the composite V2V real-time data stream to the target vehicle, and
   the target vehicle using received V2V real-time direct view data stream and the composite V2V real-time data stream from the sending vehicle to fill in the blind spot in the target vehicle 360 degree direct view thereby enabling the target vehicle to locate the hidden vehicle enabling the target vehicle to see beyond the blind spot.

7. The system of claim 6, where the target vehicle is a driverless vehicle.

8. The system of claim 6, where the sending is performed by vehicle-to-vehicle real-time data stream sending between vehicles.

9. The system of claim 6, wherein the view of the surroundings is made using the sensor selected from the group consisting of radar sensor, video camera, or ultrasound sensor.

10. The system of claim 6, wherein the sending vehicle has multiple transmitting locations.

11. The system of claim 6, further comprising displaying a 360 degree view to the target vehicle.

12. The system of claim 6, where there is a plurality of sending vehicles for sending images to another sending vehicle or to the sending vehicle to fill in blind spots of the target vehicle.

13. The system of claim 12, where the sending is performed by vehicle-to-vehicle real-time data stream sending between vehicles.

14. The system of claim 12, wherein the view of the surroundings is made using the sensor selected from the group consisting of radar sensor, video camera, or ultrasound sensor.

15. The system of claim 12, wherein each sending vehicle has multiple transmitting locations.

16. The system of claim 12, further comprising displaying a 360 degree view to the target vehicle.

17. A system for building a 360 degree direct view surrounding a target vehicle using direct (vehicle-to-vehicle) V2V real-time data streams comprising:
- a hardware processor associated with a target vehicle receiving from one or more sensors attached to the target vehicle a sensor real-time data stream;
- the hardware processor building a 360 degree direct view around the target vehicle based on the received sensor real-time data stream, wherein the 360 degree direct view includes a blind spot, defined by a visual obstruction beyond which another vehicle may be located;
- the hardware processor receiving a first V2V real-time data stream that includes data representing a 360 degree direct view around a second vehicle, and a position of origin of the second vehicle relative to the target vehicle, wherein the target vehicle and the another vehicle in the blind spot are within the 360 degree direct view around the second vehicle;
- the hardware processor receiving a second V2V real-time data stream that includes a composite data stream representing the first data stream and a 360 degree direct view around the another vehicle, and
- the hardware processor forming based on the received first and the received second V2V real-time data streams and the position of origin of the second vehicle relative to the target vehicle, a composite 360 degree direct view around the target vehicle in which information representing the blind spot is replaced with a representation of a 360 degree direct view around the target vehicle without the obstruction and the location where the another vehicle is located enabling the target vehicle to see beyond the blind spot.

18. The system of claim 17, wherein the target vehicle is a driverless vehicle.

19. The system of claim 17, wherein the real-time data streams are vehicle-to vehicle data streams.

20. The system of claim 17, wherein the sensors are selected from the group consisting of radar sensor, video camera, and ultrasound sensor.

21. The system of claim 17, further comprising the hardware processor displaying a 360 degree direct view surrounding the target vehicle.

22. The system of claim 17, comprising a plurality of second vehicles.

23. The method of claim 1, wherein the one or more sensors are selected from the group consisting of radar sensor, video camera, and ultrasound sensor.

* * * * *